(12) United States Patent  
Asano et al.

(10) Patent No.: US 7,290,074 B2  
(45) Date of Patent: Oct. 30, 2007

(54) BACK-OFF TIMING MECHANISM

(75) Inventors: Shigehiro Asano, Yokosuka (JP); Tsutomu Ishli, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 290 days.

(21) Appl. No.: 11/100,081

(22) Filed: Apr. 6, 2005

(65) Prior Publication Data

US 2006/0230205 A1    Oct. 12, 2006

(51) Int. Cl.
*G06F 13/00* (2006.01)

(52) U.S. Cl. .................. 710/110; 710/310; 713/400

(58) Field of Classification Search ............... None
See application file for complete search history.

(56) References Cited

U.S. PATENT DOCUMENTS

| 5,784,590 | A | 7/1998 | Cohen et al. |
| 5,897,656 | A | 4/1999 | Vogt et al. |
| 6,014,734 | A | 1/2000 | Tran et al. |
| 6,112,019 | A | 8/2000 | Chamdani et al. |
| 6,240,479 | B1 | 5/2001 | Snyder et al. |
| 6,360,308 | B1 | 3/2002 | Fechser |
| 6,490,642 | B1 | 12/2002 | Thekkath et al. |
| 6,493,776 | B1 | 12/2002 | Courtright et al. |
| 6,636,906 | B1 | 10/2003 | Sharma et al. |
| 6,658,520 | B1 | 12/2003 | Bennett |
| 6,694,390 | B1 * | 2/2004 | Bogin et al. .................. 710/53 |
| 6,728,816 | B1 * | 4/2004 | Worrell ...................... 710/305 |
| 6,732,208 | B1 | 5/2004 | Alsaadi et al. |
| 6,772,383 | B1 | 8/2004 | Quach et al. |
| 6,820,165 | B2 | 11/2004 | Pannell |
| 7,127,562 | B2 | 10/2006 | Dieffenderfer |
| 2004/0078507 | A1 * | 4/2004 | Bogin et al. ................ 710/310 |
| 2006/0190647 | A1 | 8/2006 | Asano et al. |

* cited by examiner

*Primary Examiner*—Glenn A. Auve
(74) *Attorney, Agent, or Firm*—Law Offices of Mark L. Berrier

(57) ABSTRACT

Systems and methods for implementing back-off timing for retries of commands sent from a master device to a slave device over a split-transaction bus. One embodiment includes a buffer having entries for storing each pending command and associated information, including a number of retries of the command and a static pseudorandom timer expiration value. The timer expiration value of each entry is compared to a running counter according to a mask associated with the number of retries of the command corresponding to the entry. When the unmasked bits of the two values match, the command is retried. In one embodiment, the same portion of the buffer entry that is used to store the number of retries and the timer expiration value is alternately used to store a slave-generated tag that is received with an acknowledgment response.

20 Claims, 4 Drawing Sheets

BACK-OFF TIMING MECHANISM

BACKGROUND

1. Field of the Invention

The invention relates generally to communications between master and slave devices and more particularly to systems and methods for implementing back-off timing in relation to retries of requests sent from a master device to a slave device.

2. Related Art

Modern high-performance computing systems may include multiple devices that perform the various of the computing system. For example, there may be multiple processors (which may act as masters, slaves, or both,) memories, input/output (I/O) devices, and the like. These different devices are typically connected to a bus so that they can communicate with each other, transfer data, and so on. Because there may be many devices that are trying to communicate using unlimited bandwidth of the bus, the communications between the devices should be as efficient as possible.

Transactions that are carried out between devices on the bus are typically executed in multiple steps or phases. For example, if a master device wishes to write data to a slave device, it is necessary in a typical system for the master to issue a write command, wait for acknowledgment from a target slave that the command can be accepted, and then transfer the write data to the bus to be sent to the target slave. There may be a number of these transactions that are being concurrently performed between the various devices on the bus, so it may be necessary to implement various mechanisms to prevent each transaction from interfering with the others.

One of the mechanisms that is commonly implemented to facilitate communications on a split-transaction bus as described above is a back-off mechanism for retries of commands that are not accepted by the target device on the first attempt. As mentioned above, a master device must wait for an acknowledgment from the target slave device in order to proceed with a transaction. If the slave device is not ready to accept the command when it is first transmitted from the master device (e.g., if the command buffer of the slave device is full,) the slave may send a RETRY response to the master. When the master device receives the RETRY response, it knows that the command has not been accepted, and may retry the command at a later time.

Because of the multi-phase nature of communications between the devices on the bus, there may be instances in which two different devices attempt to send commands to each other at approximately the same time. When each command is received by the respective target device, the target device may consider itself to be unavailable to accept the other device's command because of its own pending command and may therefore send a RETRY response to the other device. Each of the two devices must therefore retry sending its command at a later time. If both devices wait the same amount of time before sending their commands again, each of the devices will again be busy when the other device is command is received, and another retry will be necessary. This could be repeated indefinitely, with both devices stuck in an unending loop. This condition is referred to as "live lock."

In order to avoid a live lock condition, it is common to implement a back-off timing mechanism. Typically, a back-off timing mechanism will cause a device to wait for increasing periods of time before retrying commands that have not been acknowledged. The back-off timing mechanism will also implement an element of randomness in the selection of the specific waiting period. The randomness in the selection of the waiting period reduces the chance that two devices will continue to interfere with each other. The increasing magnitude of the waiting period reduces the amount of resources that are spent in retrying the commands (since a device that is still busy after a short waiting period is likely to still be busy after another short waiting period.)

In order to implement a back-off timing mechanism, it is typically necessary to track of the number of retries of a command and the amount of time that remains before the command should be retried. In conventional systems, a set of registers is provided for each pending command. One of these registers stores of the number of retries corresponding to the command (a retry counter or indicator,) while another is used for a timer (a timer expiration value.) The first register is updated each time a retry response is received from the target slave device. The second register typically stores the time remaining before the command is to be retried, and consequently must be updated at each cycle. Because a typical system provides for a number of pending commands (e.g., eight or 16,) a corresponding number of retry indicators and timer values must also be provided. Conventional back-off timing mechanisms can therefore be expensive in terms of both the space that is required for them on the chip, and the processing that is required to update the timer values for each of the commands.

It would therefore be desirable to provide systems and methods for implementing back-off timing in retries of commands, where the systems and methods make more efficient use of both the space that is required on the chip and the processing resources that are required to track the timing of the retries.

SUMMARY OF THE INVENTION

One or more of the problems outlined above may be solved by the various embodiments of the invention. Broadly speaking, the invention includes systems and methods for implementing back-off timing for retries of commands sent from a master device to a slave device over a split-transaction bus. One embodiment includes a buffer having entries for storing each pending command and associated information, such as the number of retries of the command and a static (though not permanent) pseudorandom timer expiration value. The timer expiration value of each entry is compared to a running counter according to a mask associated with the number of retries of the command corresponding to the entry. When the unmasked bits of the two values match, the command is retried. In one embodiment, the same portion of the buffer entry that is used to store the number of retries and the timer expiration value is alternately used to store a slave-generated tag that is received with an acknowledgment response. The number of retries and the timer expiration value are not needed when the slave-generated tag has been received, so they are overwritten with the tag.

One embodiment comprises a back-off timing system including a command buffer, a running counter, one or more comparators, and control circuitry. The command buffer has multiple entries, each of which has a corresponding comparator. The control circuitry is configured to store a static timer expiration value in each entry when a retry is received for the command corresponding to that entry. The control circuitry also stores an indicator of the number of retries.

The comparators compare selected bits of the static timer expiration values to corresponding bits of the running timer value. If the selected bits match, the control circuitry initiates an action such as a retry of the command corresponding to the matching entry.

An alternative embodiment comprises a back-off timing system including a command buffer and control circuitry for the command buffer. The command buffer has multiple entries, each of which is associated with a corresponding pending command. The control circuitry is configured to store back-off timing information in a first portion of each entry when a retry response is received for a command corresponding to the entry. When an acknowledgment containing a slave-generated tag is received for the command corresponding to the entry, the slave-generated tag is stored in the first portion of the entry in place of the back-off timing information.

Another alternative embodiment comprises a method for back-off timing, including storing a plurality of buffer entries containing static timer expiration values, comparing selected bits of the timer expiration values to a running counter, and initiating an action such as a retry of a command corresponding to a matching entry.

Yet another alternative embodiment comprises a method for back-off timing, including storing a plurality of buffer entries corresponding to pending commands and alternately storing back-off timing information or a slave-generated tag in the same portion of each entry, depending upon whether a retry or acknowledgment response is received.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
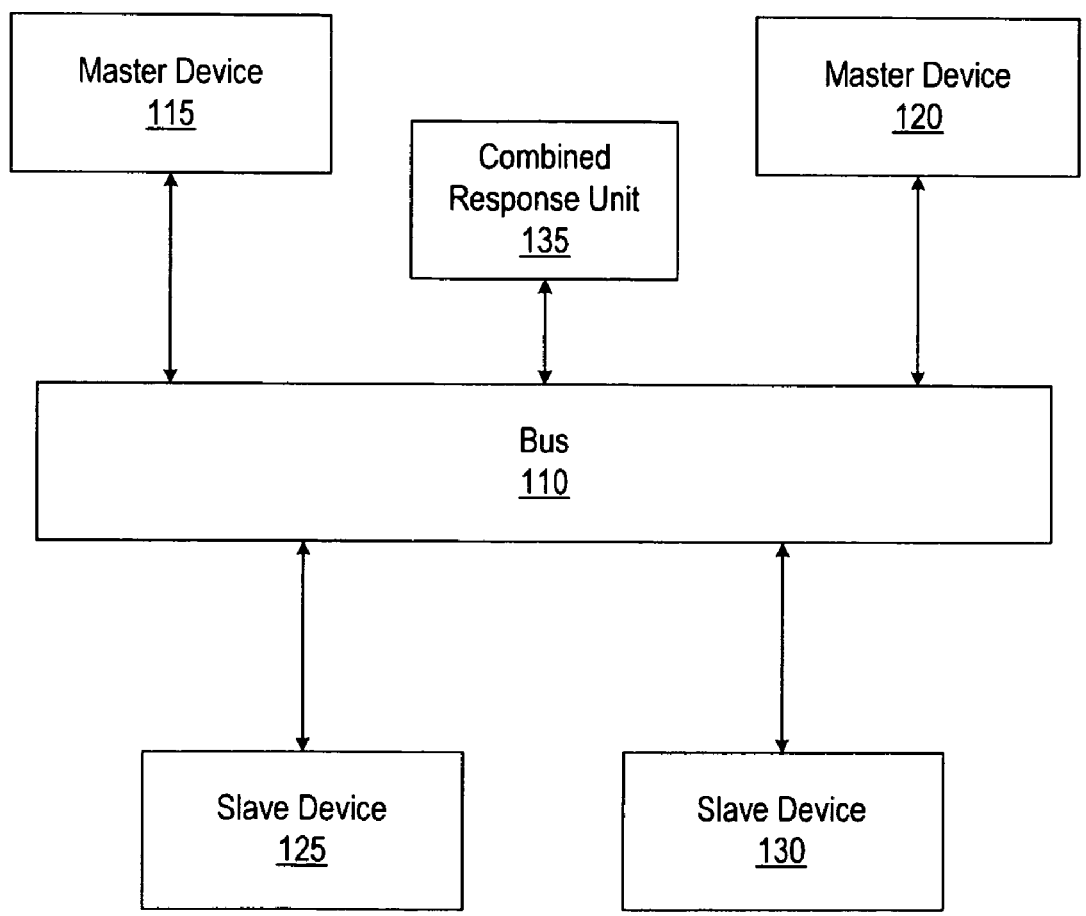
FIG. 1 is a block diagram illustrating a system having a bus that interconnects multiple master devices and slave devices in accordance with one embodiment.

While the invention is subject to various modifications and alternative forms, specific embodiments thereof are shown by way of example in the drawings and the accompanying detailed description. It should be understood that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

Broadly speaking, the invention includes systems and methods for implementing back-off timing for retries of commands sent from a master device to a slave device over a split-transaction bus, in which less resources are required than in comparable conventional systems and methods. In one embodiment, a set of registers (a command buffer) is provided for storing pending commands. For each pending command, there is a register (a buffer entry) that is configured to store information indicating the number of retries of the command, as well as a timer expiration value. A single running counter is maintained for comparison to the timer expiration values stored in the registers corresponding to the pending commands.

When a command is initially made, the command is stored in one of the buffer entries which is indexed by a corresponding identifying tag. If the command has to be retried, the number of retries corresponding to the command is stored in the buffer entry. A pseudorandom number is stored in the buffer entry as a timer expiration value. A mask is applied to the timer expiration value and a running counter of value according to the number of retries for the command. When the unmasked bits of the two values match, the command is retried (i.e., re-sent to the target slave device.)

In one embodiment, the retry counter and to the timer expiration value are stored in the same location as a slave-generated tag. In this embodiment, when a slave device responds to certain commands, a slave-generated tag is provided to facilitate a later identification (within the slave device) of communications related to the respective commands. Until a command is acknowledged, however, no such tag is assigned to the command, so the storage location provided for this tag is unused. The storage location is therefore available to store the retry counter and timer expiration value. If a slave device responds with an acknowledgment of a retried command and includes a slave-generated tag with the response, the retry counter and timer expiration value that were previously stored in the corresponding entry of the command buffer can be discarded, and the slave-generated tag can be stored in their place. Although the various embodiments of the invention may be implemented in a variety of system types, the description below will focus on a particular embodiment that is implemented in a multiprocessor system. This embodiment is intended to be illustrative, rather than limiting.

Referring to FIG. 1, a block diagram illustrating a system having a bus that interconnects multiple master devices and slave devices in accordance with one embodiment is shown. In this embodiment, the master and slave devices are configured to interact to perform various transactions. For example, one of master device 115 and master device 120 may generate a write or a read command to one of slave devices 125 and 130. The master device may then send data to or receive data from the slave device. Slave devices 125 and 130 are configured to each send a reply after receiving the command. The reply can be an acknowledgment, a retry response, or a null response. An acknowledgment indicates that the slave device can accept or send data, a null indicates that the slave is not a participant in the transaction, and a retry indicates that the requested transaction cannot be completed at that time and that the master device needs to retry sending the command at a later time.

Combined response unit 135 is configured to receive the replies from all of the slave devices, combine the replies, and broadcast a single, combined reply to all of the devices connected to the bus (including master devices and slave devices.) In one embodiment, combined response unit 135 is configured to broadcast a retry combined response if the reply from one or more of the slave devices is a retry response. The retry response may be generated by a slave device that is a direct participant in the transaction (e.g., the device to which data is written or from which data is read,) or by a slave device that is an indirect participant (e.g., a device that observes the transaction and updates locally stored information based upon the transaction.) In either case, the device is not ready for the transaction to proceed, so a retry response is sent to the master device to stall the transaction.

Because the transactions in this embodiment are split into different portions or phases (e.g., the master device sending a command, then the slave device replying to the command, etc.,) a tag scheme is used to associate the different phases of each transaction with each other. After generating a command, the master device is configured to associate a master tag (m-tag) with the generated command. The m-tag is sent with the command to a slave device and is then returned to the master device with any responses or data sent by the slave device. When the master device receives the responses or data, the master device associates the received responses or data with the transaction corresponding to the included m-tag. In one embodiment, the m-tag may be an index into a command buffer in the master device where the command and/or information about the transaction is stored. By using the m-tag as an index, information about the transaction can be quickly retrieved from the command buffer without having to compare the m-tag to each of the entries in the command buffer.

In this embodiment, a slave-generated tag (s-tag) is sometimes used in addition to the master-generated m tag. The s-tag is used in a manner that is very similar to that of the m-tag. The difference is that, while the m-tag is generated by the master device and used by the master device to index into the master device's command buffer, the s-tag is generated by the slave device and used by the slave device to index into the slave device's command buffer. In both cases, the use of the respective tags to index into the corresponding command buffers eliminates the need for expensive content-addressable memories that would otherwise be needed to look up transaction information relating to received responses. The functions of the m-tag and s-tag may be more apparent from the following explanation of an exemplary transaction.

Figure 2:
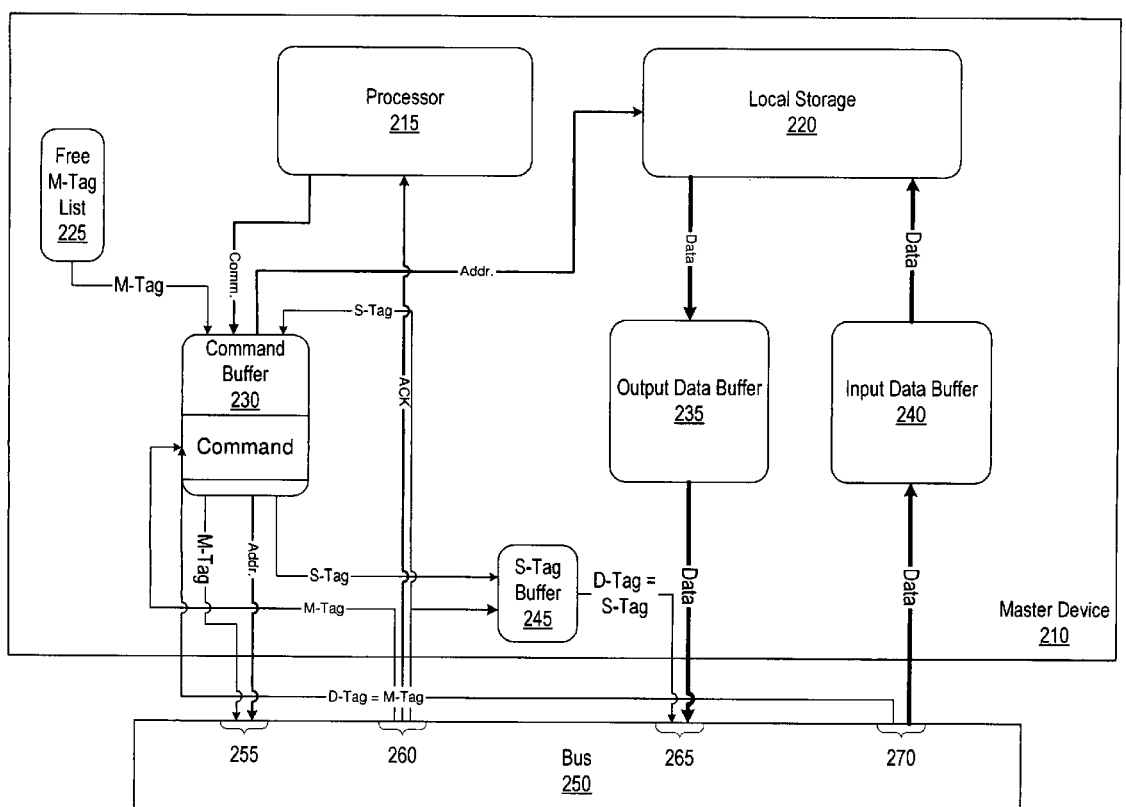
FIG. 2 is a block diagram illustrating the structure of a master device configured to perform split transactions in accordance with one embodiment.

Referring to FIG. 2, a block diagram illustrating the structure of a master device configured to perform split transactions in accordance with one embodiment is shown. In this embodiment, master device 210 is configured to generate write commands in order to transfer data from local storage 220 to a slave device over bus 250. Master device 210 is also configured to generate read commands in order to transfer data from a slave device over bus 250 to local storage 220.

In one embodiment, master device 210 generates a command (e.g., a write command) and stores the command in command buffer 230. The command may be stored with various relevant information, such as an address in local storage 220 where data is currently stored and an address in the local storage of a slave device where the data is to be written. The command is stored in command buffer 230 until the transaction associated with the command is complete.

To store the command in command buffer 230, an m-tag is obtained from free m-tag list 225. This list contains information indicating which of the m-tags are available. A particular m-tag is available if a corresponding storage location in the command buffer is available. The m-tag is used as an index into command buffer 230 where the command is stored. For example, tag 1 may correspond to the first location in the buffer, tag 2 may correspond to the second location in the buffer, and so on.

The command and the selected m-tag are then sent to the bus through lines 255. The command can be seen, not only by the slave device to which the data is to be written, but also by the other devices connected to the bus. Master device 210 sends the command prior to proceeding with the transaction (e.g., sending the data to be written) in order to ensure that the target slave device and any other devices that are indirect participants in the transaction are ready for the transaction to proceed. If all of the devices are ready for the transaction to proceed (e.g., if the target slave device can accept the write command,) the master device can proceed (e.g., to send the data.)

Master device 210 is configured to receive a reply through lines 260 in response to the command that was previously sent to the slave device. In this embodiment, the reply is a combined reply that represents the replies provided by all of the devices connected to the bus. The reply received by master device 210 contains the m-tag that the master device originally sent to the slave device and either an acknowledgment that the transaction associated with the m-tag can proceed, or a retry response indicating that the command should be re-sent at a later time.

If the reply received by master device 210 is an acknowledgment, the transaction will proceed. If the transaction is a write transaction, the combined response includes an s-tag. (As explained above, the slave device in this embodiment assigns the s-tag to the transaction in order to facilitate the lookup of the transaction in its own command buffer.) The s-tag that is received by the master device is stored in buffer 230 at the location indexed by the m-tag, along with the other information relating to the transaction. [In other embodiments, the s-tag can be stored in a buffer other than buffer 230.] When the master device is ready to process the transaction, it indexes into command buffer 230 according to the m-tag and retrieves the information needed to process the transaction. For instance, the address at which the write data is stored is sent to local storage so that the data can be retrieved, and the s-tag is written to s-tag buffer 245. (It should be noted that master device 210 may be ready to send the write data to the bus almost immediately, so the s-tag may be stored in buffer 245 when it is received by the master device.) The data retrieved from local storage 220 is sent to output buffer 235, where the data is queued to exit master device 210. The data is then sent to the slave device through lines 265, together with the corresponding s-tag from s-tag buffer 245. The command and corresponding information is then removed from command buffer 230 and the m-tag is identified as available in free m-tag list 225. This completes the transaction associated with the write command, with respect to the master device.

If the transaction is a read transaction, it is not necessary for the slave device to generate an s-tag to facilitate location of the command in the slave's command buffer. Consequently, it is not necessary for the master device to store an s-tag in its own command buffer when acknowledgment of the read command is received. Master device 210 simply waits to receive the data corresponding to the command. When read data is received by master device 210, a corresponding m-tag is received with the data. The m-tag is used to index into command buffer 230 and retrieve information associated with the transaction, such as the address in local storage 220 at which the data will be stored. After the data is stored, the command and corresponding information is removed from command buffer 230 and the m-tag is made available in free m-tag list 225, completing the read transaction in the master device.

If the combined reply received by master device 210 is a retry response, processing of the transaction must be delayed. A back-off timing mechanism is used to implement this delay. In this embodiment, when master device 210 receives the retry response, a retry indicator is stored or updated in command buffer 230 to reflect the number of retries for the command (the received retry response may be the first, or it may be one of several that have been received for the command.) A timer expiration value is also stored in command buffer 230. When the timer expiration value matches a current value of a running timer, the command is again sent by master device 210.

It should be noted that, in other embodiments, the retry indicator and timer expiration value can be stored in a buffer other than the command buffer. It should also be noted that, wherever the retry indicator and timer expiration value are stored, it is possible to use the same storage location for both these values and the s-tag. This is because the retry and timer expiration value are used for purposes of the back-off timing mechanism, and are therefore no longer necessary when an acknowledgment and corresponding s-tag are received. Similarly, it will not be necessary to store the back-off timing values in the location used by the s-tag until the transaction associated with the s-tag has been completed and information corresponding to a new transaction is stored in this location.

Figure 3:
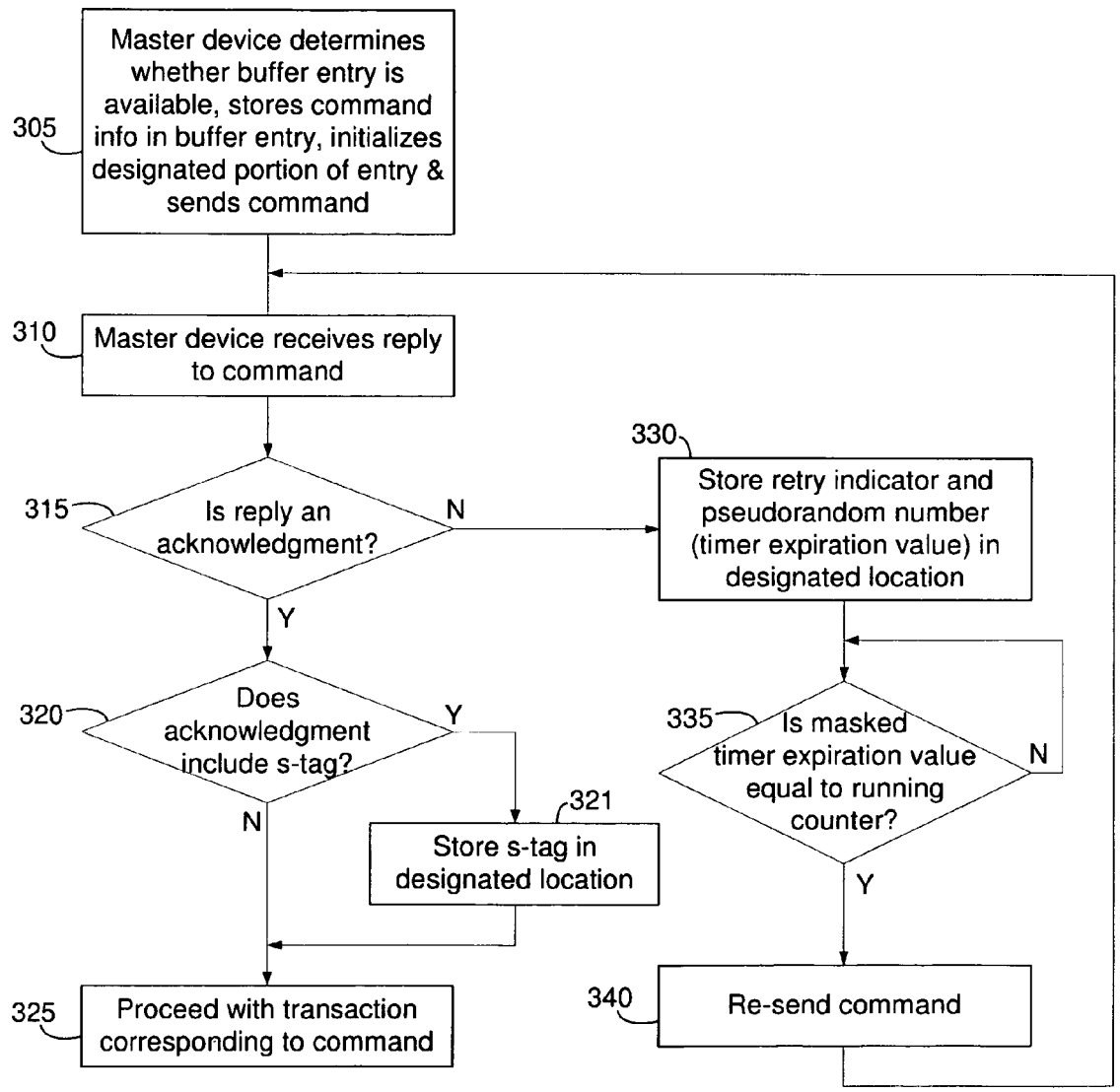
FIG. 3 is a flow diagram illustrating the alternate storage of an s-tag or back-off timing values in accordance with one embodiment.

Referring to FIG. 3, a flow diagram illustrating the alternate storage of an s-tag or back-off timing values in accordance with one embodiment is shown. Initially, the master device determines whether it has available storage locations in its command buffer. If there is an available storage location, the command is associated with the corresponding m-tag and is stored in this location, along with various other information that is needed to complete the transaction (block 305.) It is assumed in this embodiment that the master device will initialize a portion of the storage location that is designated for storage of the corresponding s-tag and/or back-off timing values (block 305.) The command is then sent to the bus by the master device (block 305.)

After the command has been sent by the master device, the master device waits for a reply. In this embodiment, the reply is generated by a combined response unit, based upon the replies of various devices that are connected to the bus. When the reply is received by the master device (block 310,), it is determined whether the reply is an acknowledgment (block 315.) If the reply is an acknowledgment, the reply may include an s-tag. As noted above, in one embodiment, acknowledgment of a write command will include an s-tag, while acknowledgment of a read command will not. It is therefore determined whether the acknowledgment includes an s-tag (block 320.) If an s-tag is included in the acknowledgment, the s-tag is stored in the designated location for the corresponding command (block 321,) and the transaction continues (block 325.) In the case of a write command, this will include retrieving the write data and sending the data to the bus with the s-tag. If it is determined that the acknowledgment does not include an s-tag (block 320,) the transaction will continue (block 325) without an s-tag having been stored.

If, at block 315, it is determined that the combined reply to the command is not an acknowledgment, then the reply is a retry response. The master device therefore stores a retry indicator value and a timer expiration value in the designated location of the corresponding command buffer entry (block 330.) After these values have been stored in the buffer, the master device begins checking the timer expiration value against the value of a running counter (block 335.) This consists of applying a mask (selected according to the retry indicator) to the timer expiration value and the value of the running counter and determining whether the unmasked bits match. This will also be explained in more detail below. If the masked values do not match, no action is taken until the running counter is incremented and the masked values are again compared. When the masked values match, the command is re-sent (block 340,) and the master device waits for the reply corresponding to the re-sent command (block 310.)

In one embodiment, the retry indicator is implemented as a counter that is incremented each time a retry corresponding to the indicator is received. Thus, the retry indicator will initially be 0, then will be 1 after one retry response, 2 after two retry responses, and so on. The counter may be configured to remain at a maximum value when the corresponding number of retries has been reached. For example, the counter may reach a maximum value of 8 upon receiving an eighth retry response, and may remain at this value after receiving additional retry responses. It should be noted that the retry indicator may be implemented in many other forms as well.

In one embodiment, the timer expiration value is provided by a pseudorandom number generator. When a retry response is received, a pseudorandom number provided by the generator is stored in the buffer entry of the command corresponding to the retry response. This value is static, and will not be updated until a new retry response is received and the timer expiration value is overwritten with a new pseudorandom number, or until an acknowledgment is received and the timer expiration value is overwritten with an s-tag or other information relating to the acknowledgment. Instead of updating this timer expiration value, the value is compared to a running counter (timer.) Because the running counter operates cyclically (i.e., increments from 0 to N, then returns to 0 and starts incrementing again,) it makes no difference whether the running counter counts to the random timer expiration value starting from 0, or from a random starting value.

The use of a running counter and a pseudorandom timer expiration value improves the efficiency of the timing mechanism in comparison to conventional mechanisms because, rather than having a separate counter for each buffer entry that has to be separately updated, only a single running counter is updated. Because on a single counter is updated each cycle, there is a significant reduction in the power consumption of the back-off timing mechanism, as well as in the amount of processing time that is required to update the counters.

While the running counter and pseudorandom timer expiration values allow for variations between the timing of different commands' retries, they do not, alone, provide for the backing-off of the timing. That is, they do not provide for the random timer values to be selected from an increasing range of values. This is implemented in the present embodiment by applying masks to the compared values.

In this embodiment, each number of retries (up to a maximum of eight) is associated with a corresponding mask. The number of retries and the corresponding mask is shown in table 1 below.

TABLE 1

| Number of retries | Mask |
|---|---|
| 0 | 00000000 |
| 1 | 00000001 |
| 2 | 00000011 |
| 3 | 00000111 |
| 4 | 00001111 |
| 5 | 00011111 |
| 6 | 00111111 |
| 7 | 01111111 |
| 8 | 11111111 |

Each mask is eight bits long, with 0's corresponding to masked bits, and 1's corresponding to unmasked bits. Each mask is applied to the eight most significant bits of the timer expiration value, which in this embodiment is 16 bits long. (The s-tag in this embodiment is 24 bits long.) It can be seen that, for each succeeding retry, one additional bit of the timer expiration value is unmasked. Thus, for zero retries, the mask is "00000000" so the eight most significant bits of the timer expiration value are masked and only the eight least significant bits are used in the comparison to the running counter. After one retry, the mask used in comparison is "00000001", so the nine least significant bits are used in the comparison of the timer expiration value to the running counter.

This mechanism results in a retry period for zero retries that is randomly selected from the range 0-255 (0-$2^8$-1,) a retry period for one retry that is selected from the range 0-511 (0-$2^9$-1,) and so on. The range of the retry period corresponding to the number of retries is shown in table 2 below.

TABLE 2

| Number of retries | Retry period |
|---|---|
| 0 | 0-255 |
| 1 | 0-511 |
| 2 | 0-1023 |
| 3 | 0-2047 |
| 4 | 0-4095 |
| 5 | 0-8191 |
| 6 | 0-16383 |
| 7 | 0-32767 |
| 8 | 0-65535 |

Since any number of the least significant bits of the counter will continually increment through all the possible values, and since any number of the least significant bits of the timer expiration value is itself a pseudorandom number in the range of the masked counter, the same running counter can be used for the back-off timing mechanism for all of the entries in the command buffer.

Figure 4:
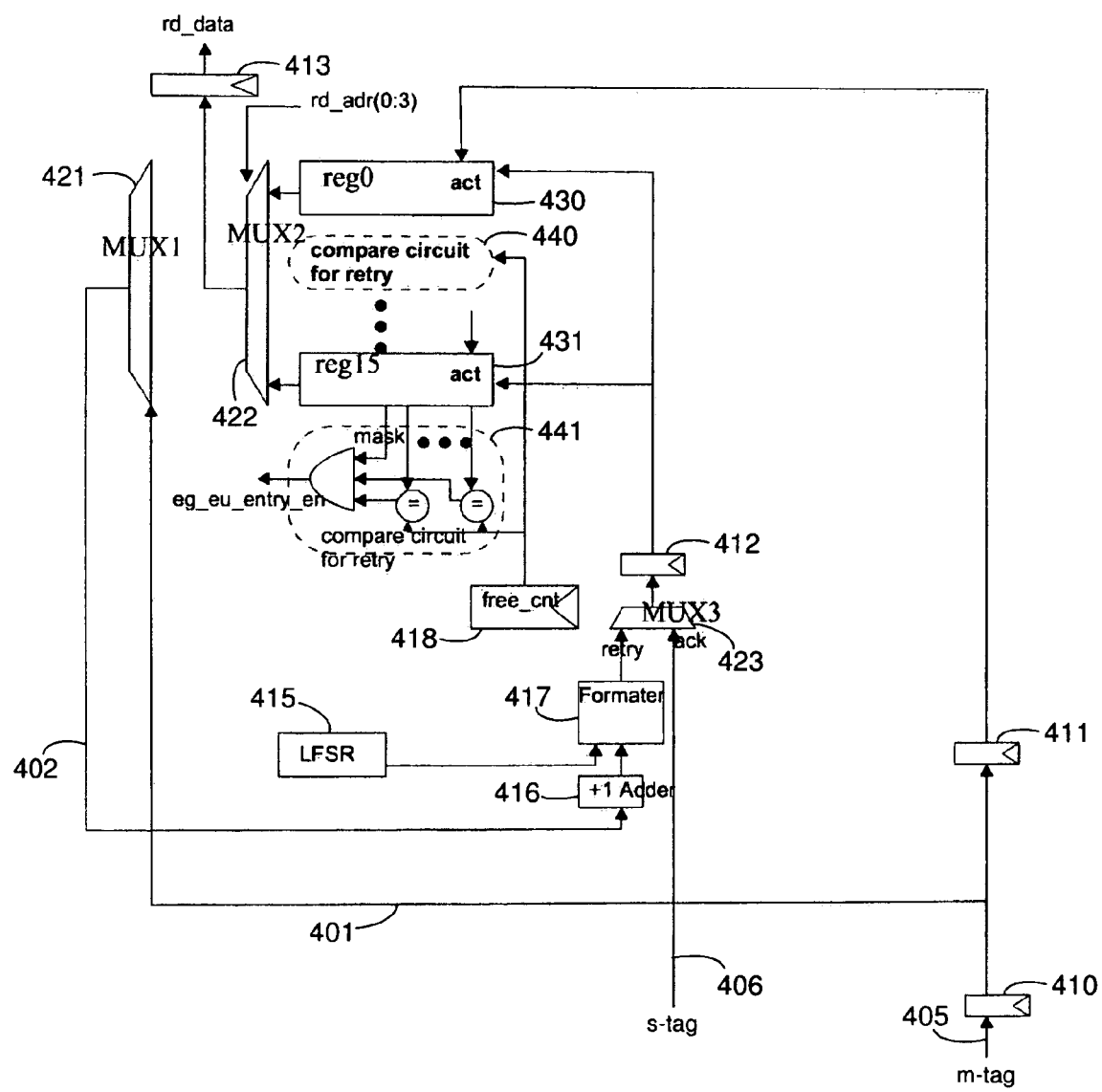
FIG. 4 is a diagram illustrating the structure of a command buffer and corresponding control circuitry that implements a back-off timing mechanism in accordance with one embodiment.

The embodiment described above can be implemented in a circuit shown in FIG. 4. FIG. 4 is a diagram illustrating the structure of a command buffer and corresponding control circuitry that implements a back-off timing mechanism in accordance with the present embodiment. When a response corresponding to a write command is received by the master device, the m-tag contained in the response is provided to the command buffer on line 405 and clocked into latch 410. If an s-tag is included in the response, it is provided to the command buffer on line 406.

The m-tag at the output of latch 410 is provided to the input of a second latch, 411, and is also provided to multiplexer 421 on line 401. The m-tag value is used as a control input to multiplexer 421, causing the multiplexer to select the one of buffer entries 430-431 corresponding to the m-tag. (Buffer entries 430-431 are provided as inputs to both multiplexer 421 and multiplexer 422—only the connection to multiplexer 422 is explicitly shown in figure for purposes of clarity.) In other words, the m-tag is used to index into the command buffer. Multiplexer 421 provides the retry indicator value of the selected entry at its output. This value is provided on line 402 to adder 416. Adder 416 increments the retry indicator value and provides the result to formatter 417. A pseudorandom number is generated by linear feedback shift register 415 and this value is also provided to formatter 417.

Formatter 417 receives the values received from linear feedback shift register 415 and adder 416 and formats these values for storage in an entry of the command buffer. The formatted values are then provided to multiplexer 423. If an s-tag is included in the response received by the master device, the s-tag is also provided to multiplexer 423 on line 406. Because this embodiment is designed to alternately store these formatted values (the retry and back-off information) or the s-tag, the formatted back-off information and the s-tag use the same number of bits (although this may not necessarily be the case in other embodiments.) Multiplexer 423 is controlled by the type of the response received by the master device. If the response is a retry response, multiplexer 423 is configured to select the back-off information received from formatter 417. If the response is an acknowledgment, multiplexer 423 is configured to select the s-tag received on line 406. The selected value is produced at the output of multiplexer 423, from which this value is input to latch 412.

When the value of the m-tag is clocked into latch 411, this value is provided at the output of this latch and is used to index into the command buffer, thereby selecting one of command buffer entries 430-431. It should be noted that, in this embodiment, while the command buffer includes 16 entries, only two of the entries (430 and 431) are explicitly depicted in the figure for purposes of clarity. At the same time the m-tag value is clocked into latch 411, the value selected by multiplexer 423 is clocked into latch 412. The value stored in latch 412 is provided to the buffer entry selected according to the m-tag value and is stored in this entry. If the response received by the master device is an acknowledgment of a write command, the value stored in the command buffer entry is the s-tag. In this case, the buffer entry indexed by the m-tag can then be selected by multiplexer 422, so that the corresponding information is provided to latch 413. This information can then be used to retrieve the write data from the master device's local storage and sent to the bass with the corresponding s-tag.

A if the response received by the master device is a retry response, multiplexer 423 selects the formatted retry and back-off information to be provided to latch 412. When this information is clocked into latch 412 and the corresponding m-tag is clocked into latch 411, the formatted retry and back-off information is stored in the command buffer entry indexed by the m-tag. Each of command buffer entries 430-431 has corresponding compare circuit 440-441 that is used to determine whether the command stored in the entry should be re-sent to the bus. For example, circuit 440 compares the retry and back-off information of buffer entry 430 to the value of free running counter 418, while circuit 441 compares the information of buffer entry 431 to the value of the counter. If the value of the pseudorandom number in a buffer entry matches the value of counter 418

(as masked in accordance with the back-off information,) a signal is asserted to initiate the retry (re-sending) of the command.

The detail of compare circuit 441 is shown in the figure. It can be seen that, in this embodiment, the mask value and the pseudorandom number stored in buffer entry 431 are provided to circuit 441. The value of counter 418 is also provided to compare circuit 441. Compare circuit 441 performs a bitwise comparison of the pseudorandom number in buffer entry 431 and the value of counter 418. The results of these comparisons are provided to a modified AND gate. The modified AND gate is configured to use the mask value to determine which of the comparison results should be considered, and which should be disregarded. As described above, the mask in this embodiment identifies how many (0-8) of the most significant bits should be disregarded. If the comparisons of all of the remaining bits are true (i.e., if all of the unmasked bits match,) than the output of the modified AND gate is asserted, indicating that the command in buffer entry 441 should now be retried.

As pointed out above, the foregoing embodiments are intended to be illustrative of the many possible embodiments of the invention. Alternative embodiments may include variations of one or more of the features described above. For example, rather than storing the back-off timing information and s-tag in the command buffer, the master device may include a different buffer that is used to store this data. As another example, alternative embodiments may not store an explicit retry counter value. Instead, a mask corresponding to a retry value may be stored with the back-off timing information, and the number of retries may be known by association with the stored mask. In such an embodiment, rather than incrementing the retry counter when a retry response is received, the bits of the mask could be shifted before being stored (e.g., "00000001" could be shifted to "00000011", or "00111111" could be shifted to "01111111".) Conversely, another alternative embodiment could explicitly store the retry counter value, and the mask to be applied could be known from its association with the retry counter value. Many other variations are possible as well.

While the disclosure of the present application discusses the invention in the context of a multi-processor computing system, it should be noted that the invention is more widely applicable and can be used in a variety of other contexts. Consequently, the disclosure should not be considered as limiting the invention to the field of multimedia game systems.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and recited within the following claims.

What is claimed is:

1. A back-off timing system comprising:
   a command buffer configured to store a plurality of entries;
   a running counter configured to count cyclically through a set of values;
   one or more comparators configured to, for each entry, compare selected bits of a timer expiration value corresponding to said each entry with corresponding bits of the current value of the running counter; and
   control circuitry configured to initiate an action corresponding to a first one of the entries in response to the one or more comparators determining that the selected bits of the timer expiration value corresponding to the first one of the entries matches the corresponding bits of the current value of the running counter.

2. The system of claim 1, wherein the back-off timing system is implemented in a master device of a multiprocessor system, and wherein the action initiated by the control circuitry comprises a retry of a command associated with the first one of the entries.

3. The system of claim 1, further comprising a pseudorandom number generator, wherein the control circuitry is configured to store a pseudorandom number provided by the pseudorandom number generator as the timer expiration value and to store a retry number indicator in each entry when a retry response is received for a command corresponding to said each entry.

4. The system of claim 3, wherein the one or more comparators are configured to determine the selected bits of the timer expiration value according to a mask associated with the retry number indicator.

5. The system of claim 4, wherein the one or more comparators are configured to apply the mask to the timer expiration value and to select a series of unmasked bits.

6. The system of claim 4, wherein the mask is applied to a first subset of bits of the timer expiration value, and wherein the selected bits always include a second subset of bits of the timer expiration value.

7. The system of claim 1, wherein the selected subset of bits of the timer expiration value comprises a consecutive series of least significant bits of the timer expiration value.

8. The system of claim 1, wherein the control circuitry is configured to:
store the timer expiration value and a retry number indicator in a first portion of each entry when a retry response is received for a command corresponding to said each entry; and
store a slave-generated tag in the first portion of each entry when an acknowledgment containing the slave-generated tag is received for the command corresponding to said each entry.

9. A method for back-off timing comprising:
storing one or more entries corresponding to pending commands, wherein each of the entries includes a static timer expiration value;
maintaining a running counter which is configured to count cyclically through a set of values;
for each entry, repetitively comparing selected bits of the corresponding timer expiration value with corresponding bits of a current value of the running counter; and
initiating an action corresponding to a first one of the entries in response to determining that the selected bits of the timer expiration value corresponding to the first one of the entries matches the corresponding bits of the current value of the running counter.

10. The method of claim 9, wherein initiating the action corresponding to the first one of the entries comprises a retrying a command associated with the first one of the entries.

11. The method of claim 9, further comprising, for each entry,
generating a pseudorandom number and storing the pseudorandom number as the timer expiration value, and
storing a retry number indicator in each entry when a retry response is received for a command corresponding to said each entry.

12. The method of claim 11, further comprising determining the selected bits of the timer expiration value for each entry according to a mask associated with the retry number indicator of said each entry.

13. The method of claim 12, further comprising applying the mask to the timer expiration value to select a series of unmasked bits.

14. The method of claim 13, wherein the mask is applied to a first subset of bits of the timer expiration value, and wherein a second subset of bits of the timer expiration value is always included in the selected bits.

15. The method of claim 14, wherein determining the selected bits of the timer expiration value for each entry comprises selecting a consecutive series of least significant bits of the corresponding timer expiration value.

16. The method of claim 9, further comprising:
storing the timer expiration value and a retry number indicator in a first portion of each entry when a retry response is received for the command corresponding to said each entry; and
storing a slave-generated tag in the first portion of each entry when an acknowledgment containing the slave-generated tag is received for the command corresponding to said each entry.

17. A back-off timing system comprising:
a command buffer configured to store a plurality of entries, wherein each entry is associated with a corresponding pending command
control circuitry configured to
store back-off timing information in a first portion of each entry when a retry response is received for a command corresponding to said each entry, and
store a slave-generated tag in the first portion of each entry when an acknowledgment containing the slave-generated tag is received for the command corresponding to said each entry.

18. The system of claim 17, further comprising: a pseudorandom number generator; and a running counter configured to count cyclically through a set of values; wherein the control circuitry is configured to store the back-off timing information including a retry indicator which indicates a number of retries of the command corresponding to said each entry and a timer expiration value which is generated by the pseudorandom number generator.

19. A method for back-off timing comprising:
storing a plurality of buffer entries, wherein each entry is associated with a corresponding pending command
storing back-off timing information in a first portion of each entry when a retry response is received for a command corresponding to said each entry; and
storing a slave-generated tag in the first portion of each entry when an acknowledgment containing the slave-generated tag is received for the command corresponding to said each entry.

20. The method of claim 19, further comprising:
maintaining a running counter which is configured to count cyclically through a set of values; and
storing as the back-off timing information a retry indicator which indicates a number of retries of the command corresponding to said each entry and a pseudorandom timer expiration value.

* * * * *